(12) United States Patent
Wu et al.

(10) Patent No.: US 9,037,703 B1
(45) Date of Patent: May 19, 2015

(54) SYSTEM AND METHODS FOR MANAGING SYSTEM RESOURCES ON DISTRIBUTED SERVERS

(75) Inventors: Yuguang Wu, Santa Clara, CA (US); Jianming He, Cupertino, CA (US)

(73) Assignee: Google Inc., Mountain View, CA (US)

( * ) Notice: Subject to any disclaimer, the term of this patent is extended or adjusted under 35 U.S.C. 154(b) by 250 days.

(21) Appl. No.: 13/408,421

(22) Filed: Feb. 29, 2012

(51) Int. Cl.
*G06F 15/173* (2006.01)
*G06F 9/50* (2006.01)
*H04L 29/08* (2006.01)

(52) U.S. Cl.
CPC ............... *G06F 9/50* (2013.01); *H04L 67/1031* (2013.01); *H04L 67/1048* (2013.01); *H04L 67/1012* (2013.01)

(58) Field of Classification Search
CPC ............ H04L 67/1012; H04L 67/1031; H04L 67/1008; H04L 67/101; H04L 67/1048; G06F 9/50; G06F 9/5005; G06F 9/5027
USPC .................... 709/223–228; 370/252
See application file for complete search history.

(56) References Cited

U.S. PATENT DOCUMENTS

| | | | | |
|---|---|---|---|---|
| 7,756,972 | B2 * | 7/2010 | Ma | 709/224 |
| 7,853,702 | B2 * | 12/2010 | Meenan et al. | 709/227 |
| 2003/0156547 | A1 * | 8/2003 | Peleg | 370/252 |
| 2005/0021771 | A1 * | 1/2005 | Kaehn et al. | 709/228 |
| 2006/0230087 | A1 * | 10/2006 | Andreasson | 707/206 |
| 2006/0253696 | A1 * | 11/2006 | Paul et al. | 713/2 |
| 2007/0074220 | A1 * | 3/2007 | Edwards et al. | 718/104 |
| 2008/0320123 | A1 * | 12/2008 | Houlihan et al. | 709/224 |
| 2012/0215855 | A1 * | 8/2012 | Goodman et al. | 709/206 |

FOREIGN PATENT DOCUMENTS

EP          1986388 A1 * 10/2008  ............. H04L 29/06

* cited by examiner

*Primary Examiner* — Farid Homayounmehr
*Assistant Examiner* — Lizbeth Torres-Diaz
(74) *Attorney, Agent, or Firm* — Honigman Miller Schwartz and Cohn LLP

(57) ABSTRACT

Systems and methods for managing system resources on distributed servers are discussed. The servers may determine, using control circuitry, a system resource metric of the server. The system resource metric may be compared with a pre-determined threshold value. Based on the comparison of the system resource metric with a pre-determined threshold value, the server may determine whether to initiate maintenance on the server. If it is determined that maintenance should be initiated, the server may enter a not-in-service mode and the server may initiate maintenance. Once maintenance is complete, the server may exit the not-in-service mode.

40 Claims, 7 Drawing Sheets

SYSTEM AND METHODS FOR MANAGING SYSTEM RESOURCES ON DISTRIBUTED SERVERS

BACKGROUND

This disclosure relates to a method and system for managing system resources on distributed servers. More particularly, this disclosure relates to a processor configured to determine when a server should perform maintenance.

Currently, many distributed software servers are implemented using the JAVA programming language. One of the benefits of using the JAVA programming language is its support for runtime automatic memory management, known as "garbage collection (GC)", implemented via an underlying JAVA Virtual Machine (JVM). DC is one type of maintenance performed on the server that is used to manage memory on the server. While GC can be used to improve memory allocations and deallocations within a program, there are drawbacks with using GC.

One drawback of using GC is that non-determinism may be introduced to the server. CC may be performed at any time based on the utilization of runtime resources. Thus, GC may be performed at an inopportune time when the server is under a heavy load. Executing GC when the server is serving a heavy load may cause server response to slow. Furthermore, because a server may begin GC at any time, happenstance, perform GC at the same time. If enough servers, that provide a particular service, perform GC at the same time, that service may become unresponsive across the network until GC is completed.

Another drawback of using GC is that when GC is being performed on a particular serer, that server itself can become unresponsive. The unresponsiveness may be caused by GC utilizing runtime resources on the server, which could cause other jobs to practically halt in progress until GC has completed.

Therefore, to prevent maintenance from causing services provided by the distributed servers from become unresponsive, maintenance processes, such as GC, may be actively managed.

SUMMARY

Accordingly, systems and methods disclosed herein provide techniques for managing system resources on distributed servers. Certain implementations relate to methods for managing system resources on a server. The server may include control circuitry configured to control the operation of the server. Processes and operations performed by the server may be implemented using the control circuitry. The server may determine a system resource metric of the server. The system resource metric may be compared with a pre-determined threshold value. Based on the comparison of the system resource metric with a pre-determined threshold value, the server may determine whether maintenance should be initiated on the server. If it is determined that maintenance should be initiated, the server may enter a not-in-service mode and the server may initiate maintenance. Once maintenance is completed, the server may exit the not-in-service mode.

Certain implementations relate to a system for managing system resources on a server. The system may include a server systems, which may include a plurality of servers; a dispatcher system, which may include a plurality of dispatchers; and a client system, which may include a plurality of clients. Each server may include server control circuitry configured to control the operation of the server. Processes and operations performed by the server may be implemented using the server control circuitry. Each dispatcher may include dispatcher control circuitry configured to control the operation of the dispatcher. Processes and operations performed by the dispatcher may be implemented using the dispatcher control circuitry. Each client may include client control circuitry configured to control the operation of the client. Processes and operations performed by the client may be implemented using the client control circuitry.

Each server may determine a system resource metric of the server. The server may compare the system resource metric of the server with a pre-determined threshold value. Based on the comparison, the server may determine whether to initiate maintenance. Based on determining whether to initiate maintenance, the server may enter a not-in-service mode, during which maintenance may be initiated on the server. Once maintenance is completed on the server, the server may exit the not-in-service mode. Each dispatcher may receive notification that a server has entered the not-in-service mode. The dispatcher may then indicate in a list of servers that the server has entered the not-in-service mode. The dispatcher may also receive a job request from a client system. The dispatcher may select, from the list of servers, a first server to which to provide the job request. The dispatcher may determine whether the first server to which to provide the job request is in the not-in-service mode. Based on whether the first server is in the not-in-service mode, the dispatcher may forward the job request to the first server. Each client may provide a job request to the dispatcher system.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

To provide an overall understanding of the disclosure, certain illustrative implementations will now be described, including systems and methods for managing system resources on distributed servers. However, it will be understood by one of ordinary skill in the art that the systems and methods described herein may be adapted and modified as is appropriate for the application being addressed and that the systems and methods described herein may be employed in other suitable applications, including data center systems and cloud computing systems, and that such other additions and modifications will not depart from the scope thereof.

Figure 1:
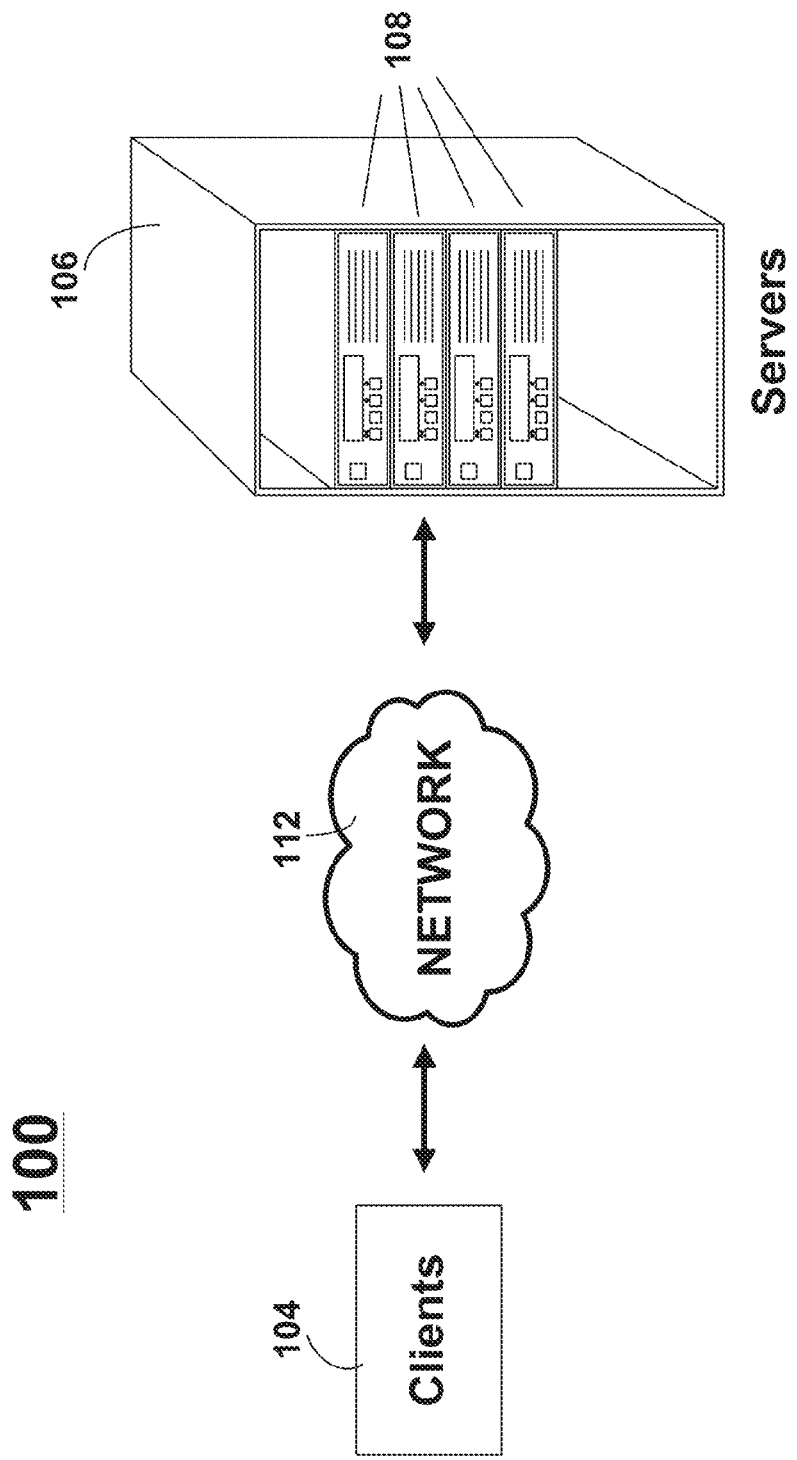
FIG. 1 is a simplified representation of the server resource management system where a distributed server system and clients communicate through a network in accordance with an implementation of the disclosure.

FIG. 1 shows a simplified representation of server resource management system 100. The server resource management system 100 may include distributed server system 106, and clients 104. Each distributed server 108, and each of the clients 104, may communicate among each other through a network 112. Each server may include server control circuitry configured to control the operation of the server. Processes and operations performed by the server may be implemented using the server control circuitry. Each client may include client control circuitry configured to control the operation of the client. Processes and operations performed by the client may be implemented using the client control circuitry. The clients 104 may provide job requests to distributed server system 106. Clients 104 may determine which server 108 to provide the job request to. Server 108 may receive job requests and process the requests. The processed job requests may produce results which server 108 may communicate to clients 104.

Each of the distributed software servers 106 may use automatic system resource managers to manage the system resources on a server 108. An example of an automatic system resource manager is automatic memory management, or GC, which can be found in applications implemented using the JAVA programming language. Many other programming languages also provide automatic memory management including PYTHON, RUBY and SCALA. Automatic memory management is only one example of a system resource manager. Any other service which manages resources on server 108 may be considered to be a system resource manager within this disclosure.

Figure 2:
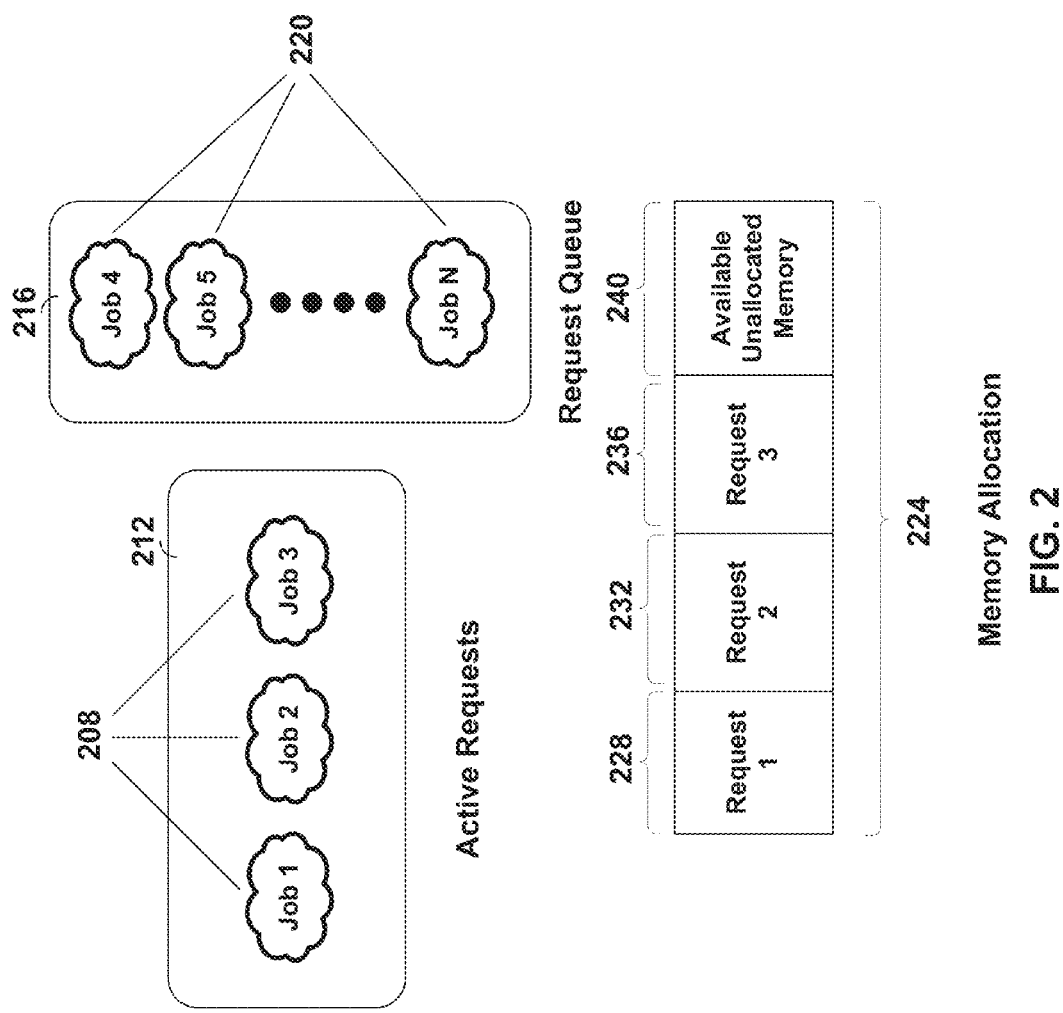
FIG. 2 is a representation of incoming job requests being processed on the server in accordance with an implementation of the disclosure.

FIG. 2 shows a representation of incoming job requests being processed on server 108. Server 108 may receive job requests and store the job requests into request queue 216. The size of request queue 216 may be pre-determined and based on the system resources on the server 108. Once system resources are available, job requests 220, which are waiting to be processed in the request queue 216, may be processed. The number of actively processed job requests 208, which are no longer waiting in the request queue 216 and are now actively being processed, may vary, but may be based on the available system resources on server 108.

Server 108 may allocate memory 224 to each active job request 208. The amount of memory 224 that active job request 208 is allocated may vary based on the memory requirement of active job request 208. For example, active job Request 1, Request 2, and Request 3 are allocated three separate portions of memory 228, 232, and 236, respectively. The unallocated memory 240 may be used for other job requests 220 waiting in request queue 216 that may become active.

Automatic memory managers (as used in JAVA and other programming languages) may determine when to free memory by performing GC. Active job requests 208 may gradually require more memory to be allocated than was initially allocated. Once all of the memory 224 is allocated, active job requests 208 that require more memory 224 may run significantly slower. Therefore, server 108 may perform GC to free up memory 224 and make available as much unallocated memory 240 as possible. If memory 224 is freed up using GO, active job requests 208 may be completed more quickly, and more job requests 220 may be actively processed at the same time with more available resources.

Automatic system resource managers, such as GC or any other automatic system resource manager, may consume a significant amount of systems resources when executed. This may impact the progress of active job requests 208 and may cause significant delay in processing job requests 220 still waiting in request queue 216.

Figure 3:
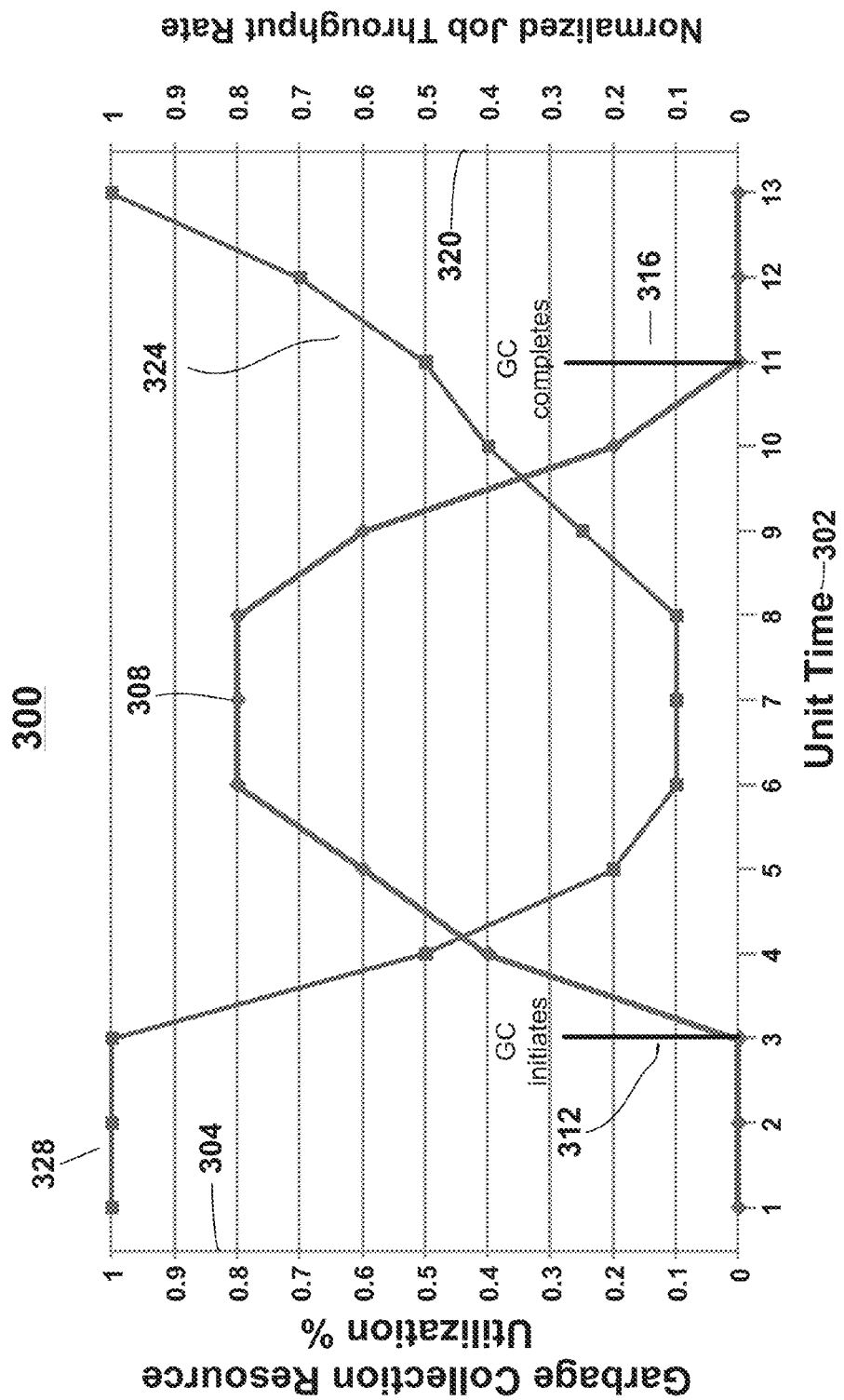
FIG. 3 is a graph representation of the runtime resource utilization of GC and of the job requests on the server in accordance with an implementation of the disclosure.

FIG. 3 depicts graphic representations of runtime resource utilization of GC, and job request throughput, on servers 108, showing an example of the effects on the job request throughput as GC is performed. The X-axis 302 represents units of time. The Y-axis 304 corresponds to curve 308, which represents the percent of total system resources used by GC on server 108. The Y-axis 320 corresponds to curve 328, which represents the job request throughput rate normalized to the maximum job request throughput rate. At time indices 1 and 2, GC is not running and server 108 is able to process job requests cc the maximum throughput. At time index 3, GC is initiated on server 108. Eventually, GC begins to utilize a large amount of system resources on server 108. As GC consumes more system resources, the job request throughput rate dramatically decreases. The decrease in throughput leads to increased delays in completing job requests. Not only has the job request throughput dramatically decreased, but also server 108 may still continue co receive new job requests. The combination of decreased request throughput, and increased number of requests in the request queue, may lead to substantial delays in response to clients 104.

In order to minimize the delay in processing job requests, example techniques for system resource management are discussed with reference to FIGS. 4-7.

Figure 4:
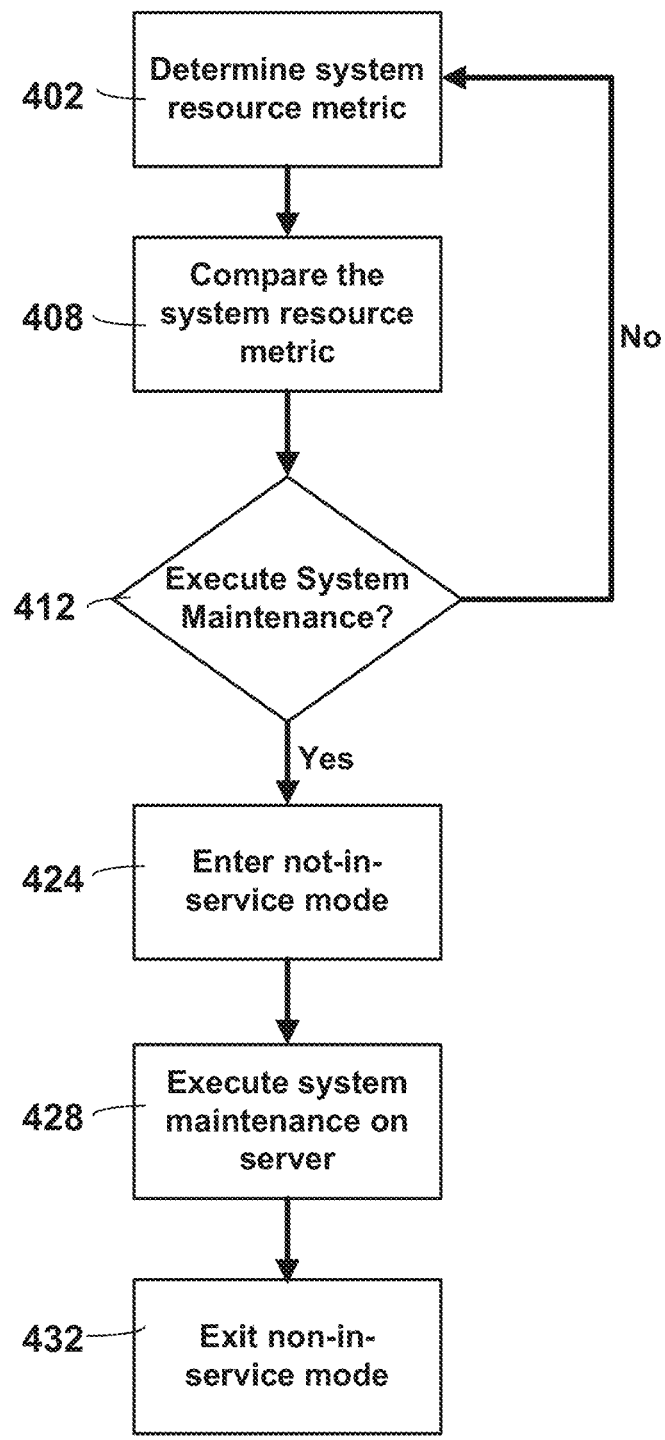
FIG. 4 is a flowchart representation of a first technique for determining when to execute maintenance in accordance with an implementation of the disclosure.

FIG. 4 shows a flowchart representation of a first technique for determining when to execute maintenance on server 108. At 402, server 108 determines a system resource metric. The system resource metric may indicate the available resources available on server 108. At 408, server 108 compares the system resource metric with a pre-determined threshold value. At 412, server 108 determines whether maintenance needs to be performed on server 108. The determination to perform maintenance may be based on a comparison of system resource metrics to the pre-determined threshold value. If server 108 determines that maintenance does not need to be performed, then server 108 may determine a new system resource metric at 402 if server 108 determines that maintenance is needed to be performed, then, at 424, server 108 enters a not-in-service mode. Once server 108 enters the not-in-service mode, server 108 may initiate maintenance at 428. After maintenance is completed, server 108 exits the not-in-service mode.

In certain implementations, initiating maintenance, at 428, may include performing GC. GC may be used to free up unused allocated memory on server 108. However, in certain environments, GC is not guaranteed to run when executed. The operating system or underlying virtual machine may decide, using internal algorithms that may not be configurable, that GC is not actually needed, even though the server determines that GC is needed and explicitly executes GC. However, server 108 may want GC executed because it may be known that system resources may be needed soon, or that current system load is currently low, so that job request performance is not affected when load increases. Therefore, in order to force GC to be performed, server 108 may need to force the operating system or underlying virtual machine to decide that GC is necessary when server 108 executes GC. Forcing GC to be performed may include temporarily allocating a large portion of the unallocated memory 240, temporarily utilizing a large portion of the system resources, such as processor time or memory bandwidth, or increasing the number of active jobs 208 currently being processed by the server 108. For example, in certain implementations, executing GC may include allocating a portion of the available free memory before executing GC itself. If a larger amount of memory is allocated, performance of GC will be forced because the amount of free memory will have been reduced. It may be necessary to allocate all available free memory in order to force GC to be performed. Once GC has been completed, any memory that was allocated simply to force GC to be performed may be deallocated.

In certain implementations, determining the system resource metric at 402, or determining whether to initiate maintenance at 412, may occur in response to a change in the load of server 108. For example, a change in the load of server 108 may result from receipt of a new job request, or from completion of a job request that was previously received. In certain implementations, determining the system resource metric at 402, or determining whether to initiate maintenance at 412, also may occur at a pre-determined time interval.

In certain implementations, determining the system resource metric at 402, or determining whether to initiate maintenance at 412, also may occur based on a performance metric. Server 108 may calculate a performance metric and compare that metric value with a pre-determined performance metric. Performance metrics show how system resources may be affecting the performance of server 108, as opposed to determining the actual utilization of system resources of server 108. In certain implementations, performance metrics may be periodically checked more frequently than resource metrics, and may be a good indicator that system resource metrics should be checked to determine whether so initiate maintenance. In some implementations, performance metrics also may be used directly to determine whether to initiate maintenance. Examples of performance metrics may include job request throughput rate, processor utilization, memory utilization, network bandwidth utilization, and power usage.

In certain implementations, the system resource metric may be the number of requests in a request queue. The number of requests in the request queue may be compared to a threshold based on the maximum size of the request queue. The threshold may also be set as a selectable fraction of the maximum request queue size based on the availability of other system resources like memory or processor utilization.

In certain implementations, the system resource metric may be based on the memory usage on server 108. Server 108 may determine the current memory usage. Programming languages like JAVA include functions that return the amount of total memory and the amount of available memory. The current memory usage may be compared to a pre-determined threshold based on the total amount of memory available. The threshold may also be set as a selectable fraction of total memory available. This comparison may be used to determine whether maintenance needs to be performed to free up memory.

In some implementations, determining whether to initiate maintenance at 412 may be based on a probability metric. Each server 108 in distributed server system 106 may operate independently from one another. In order to prevent all servers from executing maintenance at the same time, which may cause particular services provided by distributed server system. 106 to become unresponsive, each server 108 may use a probability metric to determine whether to initiate maintenance. Because each server 108 uses probability to determine whether to initiate maintenance, the likelihood that multiple servers, let alone all the servers, will initiate maintenance at the same time is reduced. The probability metric may be based on the determined system resource metric. For example, servers 108 which have high system resource metrics, because request queues are almost full, may have a high probability of needing maintenance. Alternatively, for example, servers 108 which have low system resource metrics, because request queues are empty or nearly empty, may have a low probability of needing maintenance. The condition of the request queue is not the only determinate of the system resource metric. Any other condition of a system resource metric or combination of multiple system resource metrics may be used to determine the probability metric.

There may be a function relating the system resource metric to the probability metric. For example, server 108 may use the difference between the system resource metric and the pre-determined threshold for the system resource metric, as an input to the function to determine the probability metric. Alternatively, server 108 may use a fraction of the resource metric as an input to the function to determine the probability metric. The function is not limited by these examples, and may take as inputs any number or combination of system resource metrics, and may apply a difference, fraction, ratio or any other mathematical operation on or between the system resource metrics to determine the probability metric.

In certain implementations, determining whether to initiate maintenance at 412 may be based on whether a different server within the distributed server system 106 has entered not-in-service mode or not. Server 108 may determine whether another server has entered not-in-service mode before determining whether to initiate maintenance. Server 108 may determine the number of servers in the distributed server system. 106 that have entered not-in-service mode, which may also include the number of servers currently performing maintenance. After determining the number of servers in not-in-service mode, server 108 may compare that number with a pre-determined threshold value of servers that should be in not-in-service mode. If the number of servers currently in not-in-service mode is greater than or equal to the pre-determined threshold, then server 108 may be prohibited from initiating maintenance in order to prevent more servers from performing maintenance at the same time. Otherwise, server 108 may determine that maintenance should be initiated.

In certain implementations, entering of server 108 into the not-in-service mode, at 424, may result in notifying clients 104 that server 108 is unavailable for job requests. If clients 104 are notified that server 108 has entered not-in-service mode, clients 104 may suspend sending requests to server 108 (because requests sent to server 108 may have a delayed response), and may select another server to which to provide job requests. After maintenance has been completed, and server 108 has exited not-in-service mode, a notification may be sent to clients 104 that server 108 is available for job requests. Once server 108 exits not-in-service mode, server 108 may resume processing requests without delay. In certain implementations, notification may be sent to clients 104 by server 108, itself, or by another system that has been notified that server 108 has entered or exited not-in-service mode.

In certain implementations, after server 108 has entered not-in-service mode, server 108 may complete all of the job requests on server 108 before initiating maintenance. If all job requests, including all active jot) requests 208 and all of the pending job requests 220 in request queue 216, are completed before initiating maintenance, clients 104 may receive responses so their job requests with less delay than if maintenance were to be performed while the job requests were still active or pending. After all job requests 220 in the request queue 216 are completed, server 108 may initiate maintenance. In certain implementations, server 108 may complete only the active job requests 208, and pause pending job requests 220 waiting in request queue 216, before initiating maintenance. In certain implementations, server 108 may pause all of the job requests, including all active job requests 208 and all of the pending job requests 220 in request queue 216. If all of the job requests are paused, maintenance does not have to compete for system resources with currently processed job requests. This may allow maintenance to be completed faster, returning server 108 back to normal operation sooner than if the job requests were not paused. After maintenance has been completed, and server 108 has exited not-in-service mode, server 103 may resume all of the paused job requests.

Figure 5:
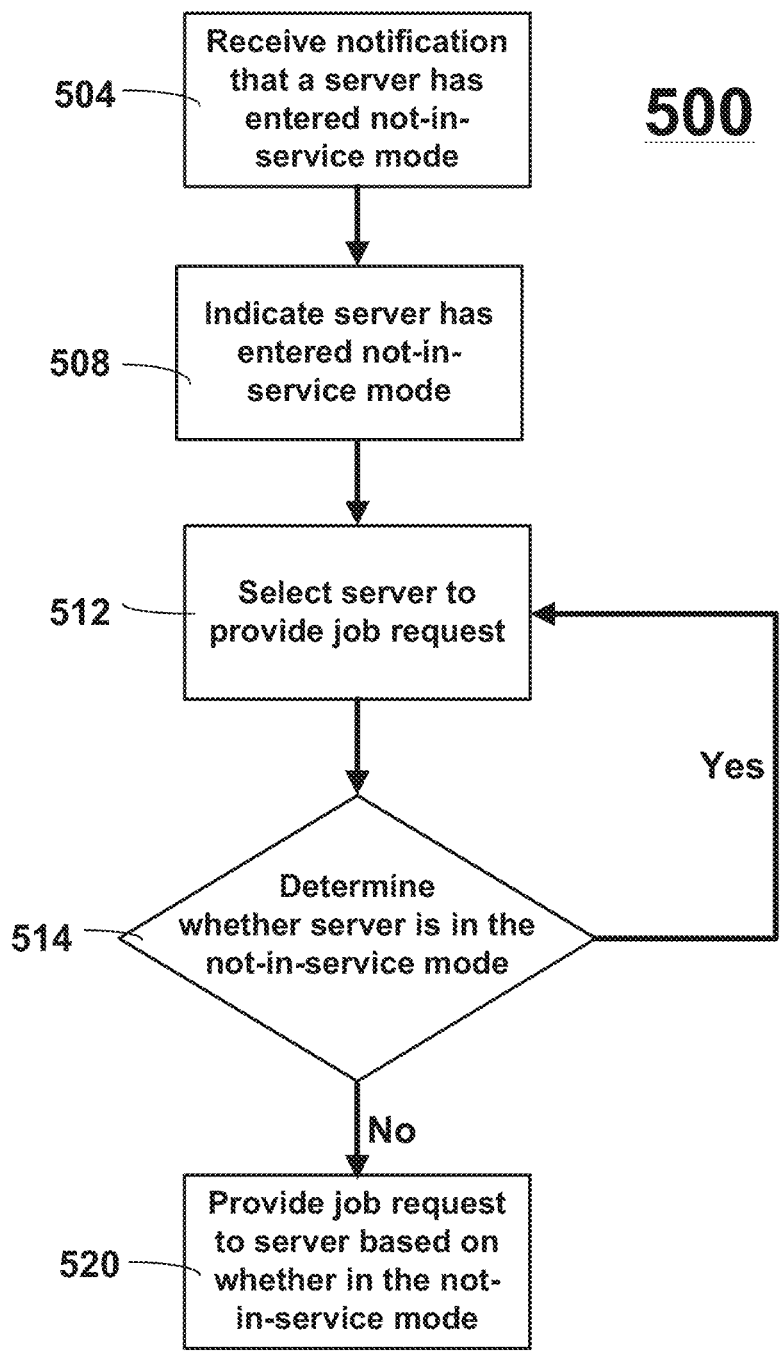
FIG. 5 is a flowchart representation of a client system of the first technique in accordance with an implementation of the disclosure.

FIG. 5 shows a flowchart representation 500 of a first technique for determining, at client system 104, a server to which to provide job requests. At 504, clients 104 may receive notification that a server 108 has entered a not-in-service mode. Once a server 108 enters not-in-service mode, clients 104 may still be permitted to send job requests to this server 108, but responses from this server 108 may be delayed. Therefore, having none or only a few clients 101 send their job requests to server 108 would allow for responses to job requests from clients 104 to be received in a timely manner. In some implementations, clients 104 may be prohibited from sending job requests to this server 108, once this server 108 has entered not-in-service mode. After receiving the notification that server 108 has entered the not-in-service mode, at 508, clients 104 may indicate server 108 as being in the not-in-service mode by setting a value in a list indicating that the server 108 has entered not-in-service mode, or by removing server 108 from the list of available servers. The list, of servers may allow clients 104 to determine which server to send its job requests to. Once clients 104 receive notification that server 108 has exited the not-in-service mode, clients 104 may indicate server 108 as available by resetting the value in the list (if server 108 had remained in the list) or by adding server 108 back to the list of available servers.

When clients 104 would like to send a job request to the distributed server system. 106, at 512, clients 104 may select a server 108 from among the list of servers in the distributed server system 106. Once a server 108 is selected, at 514, clients 104 may determine whether or not server 108 is in a not-in-service mode. After determining that server 108 is not in not-in-service mode, clients 104 may provide the job request to server 108, at 520. If clients 104 determines that server 108 is in the not-in-service mode, clients 104 may select another server in the list to which to provide its job request, at 512. Alternatively, if the list only contains the available servers, then clients 104 would not have to determine whether the selected server 108 is in not-in-service mode and may proceed in selecting a server 108 to which to provide the job request.

Figure 6:
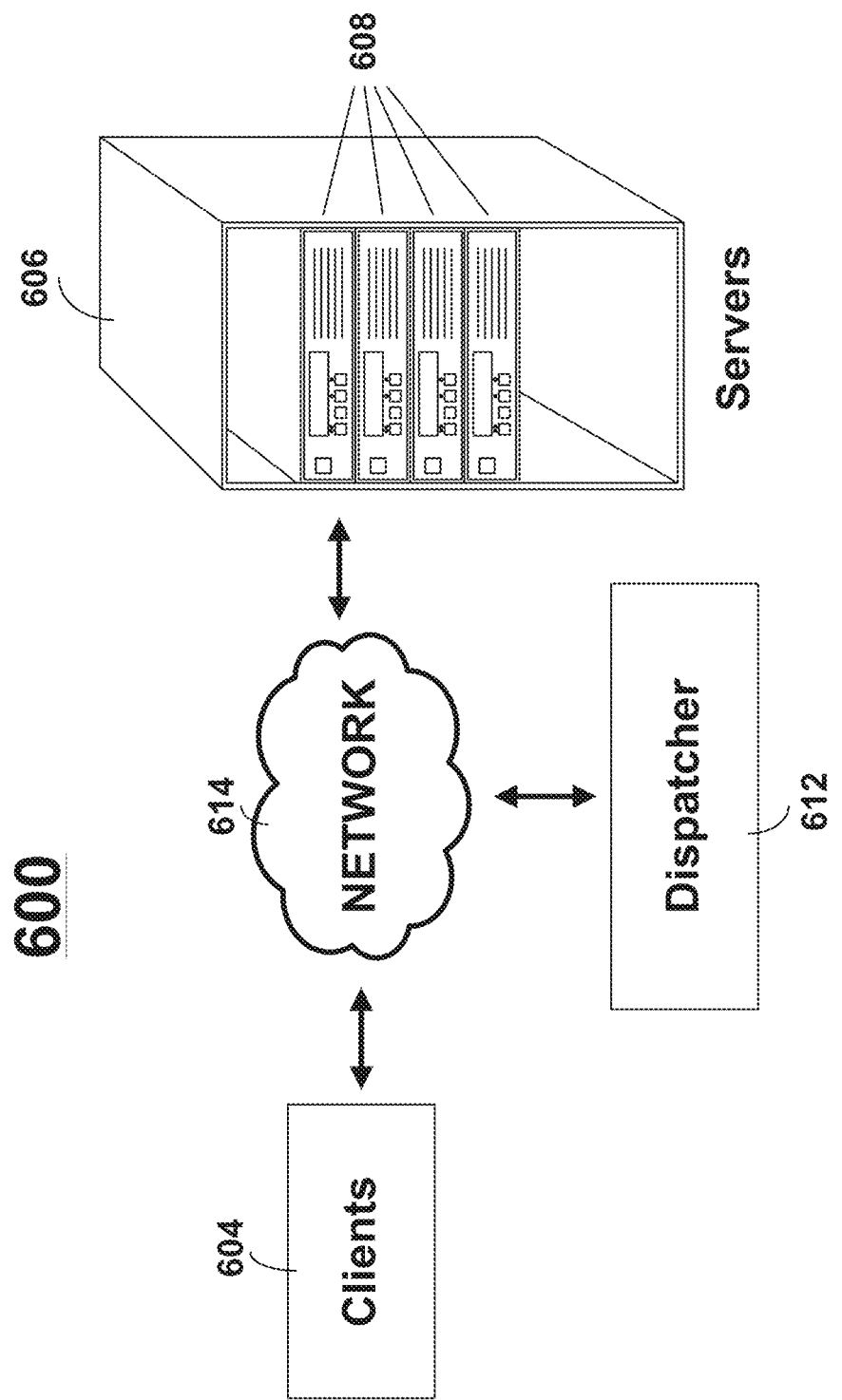
FIG. 6 is a simplified representation of the server resource management system where a distributed server system, a dispatcher, and clients communicate through a network in accordance with an implementation of the disclosure.

FIG. 6 shows a simplified representation of server resource management system 600. In certain implementations, the server resource management system 600 may include distributed server system 606, dispatcher 612, and clients 604. Each server 608 may include server control circuitry configured to control the operation of the server 608. Processes and operations performed by the server 608 may be implemented using the server control circuitry. Each dispatcher 612 may include dispatcher control circuitry configured to control the operation of the dispatcher 612. Processes and operations performed by the dispatcher 612 may be implemented using the dispatcher control circuitry. Each client 604 may include client control circuitry configured to control the operation of the client 604. Processes and operations performed by clients 604 may be implemented using the client control circuitry.

These systems may communicate among each other through a network 614. Instead of having clients 604 manage which server 608 to which to send job requests, server resource management system 600 may include dispatcher 612, which selects server 608 to which to provide the job requests. The clients communicate through network 614 to dispatcher 612. Dispatcher 612 may receive the job requests from clients 604 and forward them to servers 608. Alternatively, dispatcher 612 may communicate to clients 604 which server 608 should be provided the job request. In certain implementations, there may be multiple dispatchers 612 that can receive job requests. Clients 604 may select from a list of dispatchers which to provide job requests. Distributed server system 606 may be configured similarly to distributed servers 106 in the first technique, described above. The difference may be that server 608 may receive job requests from dispatcher 612 rather than from clients 604. However, server 608 also may receive job requests from clients 604. In some implementations, certain clients 604 may be configured similarly to clients 104 in the first technique. The clients 604 may decide not the use dispatcher 612 and manage which server 608 to provide job requests to on their own. This may relieve some pressure from dispatcher 612 from having to manage every job request from every client 604. Each dispatcher 612 may determine individually or as a group, whether clients 604 should use dispatcher 612 to manage which server 608 to provide job requests to. Additionally, clients 604 may determine for themselves whether or not to use dispatcher 612 to manage which server 608 to provide jobs requests to.

Figure 7:
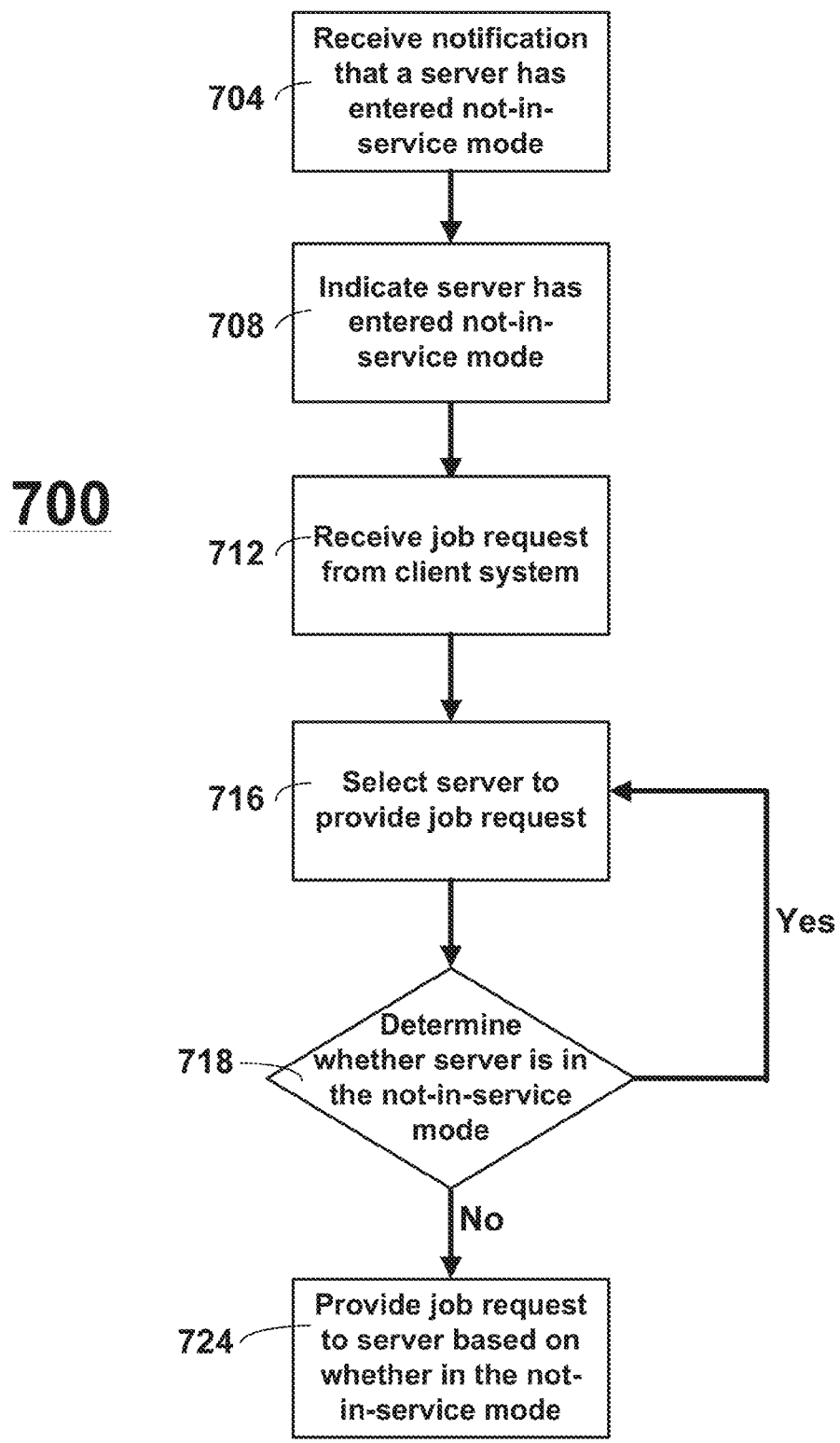
FIG. 7 is a flowchart representation of a dispatcher system of a second technique for determining when to execute maintenance on a server in a distributed server system in accordance with an implementation of the disclosure.

FIG. 7 shows a flowchart representation of a second technique as performed at dispatcher system. 612 for determining when to execute maintenance on server 608 in a distributed server system 606. Dispatcher 612 may determine which server 608 to send job requests to. At 704, dispatcher 612 may receive notification that a server 608 has entered a not-in-service mode. Once a server 608 enters not-in-service mode, dispatcher 612 may still be permitted to send job requests to this server 608, but responses from this server 608 may be delayed. Therefore, permitting dispatcher 612 to send a limited number of job requests to server 608 would allow for responses to job requests forwarded by dispatcher 612 to be received in a timely manner. In some implementations, dispatcher 612 may be prohibited from sending job requests to this server 608, once this server 608 has entered not-in-service mode. After receiving the notification that server 608 has entered the not-in-service mode, at 708, dispatcher 612 may indicate server 608 as being in the not-in-service mode by setting a value in a list indicating that server 608 has entered not-in-service mode, or by removing server 608 from the list of available servers. The list of servers may allow dispatcher 612 to determine which server to provide job requests to. Once dispatcher 612 receives notification that server 608 has exited the not-in-service mode, dispatcher 612 may indicate server 608 as available by resetting the value in the list (if server 608 had remained in the list) or by adding server 608 back to the list of available servers.

At 712, when dispatcher 612 receives a job request, dispatcher 612 may select a server among the list of servers in the distributed server system 606, at 716. Once server 608 is selected, at 718, dispatcher 612 may determine whether or not server 608 is in a not-in-service mode. After determining that server 608 is not, or no longer, in not-in-service mode, dispatcher 612 may provide the received job request to server 608, at 724. If dispatcher 612 determines that server 608 is in not-in-service mode, dispatcher 612 may select another server in the list to which to provide the received job request, at 716. Alternatively, if the list, only contains the available servers, then dispatcher 612 would not have to determine whether selected server 608 is in not-in-service mode and may proceed in selecting a server 608 to which to provide the job request.

It will be apparent to one of ordinary skill in the art that aspects of the present disclosure, as described above, may be implemented in many different forms of software, firmware, and hardware in the implementations illustrated in the figures. The actual software code or specialized control hardware used to implement aspects consistent with the principles of the disclosure is not limiting of the invention. Thus, the operation and behavior of the aspects of the disclosure were described without reference to the specific software code it being understood that one of ordinary skill in the art would be able to design software and control hardware to implement the aspects based on the description herein.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Further, certain portions of the disclosure may be implemented as "logic" or a "component" that performs one or more functions. This logic may include hardware, such as an application specific integrated circuit or a field programmable gate array, software, or a combination of hardware and software.

What is claimed is:

1. A method for managing system resources on a server system having a plurality of servers, the method comprising:
    storing, using control circuitry, job requests provided to a server of the server system within a request queue until being processed by the server;
    allocating, using the control circuitry, a portion of memory of the server to each job request actively being processed by the server, wherein the remaining portion of the memory includes unallocated memory available for job requests waiting within the request queue yet to be processed by the server;
    determining, using control circuitry, a system resource metric of the server;
    comparing, using the control circuitry, the system resource metric of the server with a pre-determined threshold value;
    determining, using the control circuitry, whether to initiate maintenance on the server based on the comparing, wherein determining whether to initiate maintenance on the server further comprises:
        determining a number of different servers of the server system that are in a not-in-service mode; and
        comparing the number to a threshold value of servers in not-in-service mode, wherein the server is precluded from entering the not-in-service mode when the number exceeds the threshold value;
    entering, using the control circuitry, the server into the not-in-service mode based on the determination of whether to initiate maintenance on the server;
    allocating, using the control circuitry, the unallocated memory of the server based on the determination of whether to initiate maintenance on the server, the unallocated memory that is allocated comprising an amount of unallocated memory needed to force initiating maintenance on the server;
    initiating, using the control circuitry, maintenance on the server in response to the server entering the not-in-service mode; and
    upon completion of the maintenance,
        exiting, using the control circuitry, the not-in-service mode, and
        deallocating, using the control circuitry, the memory needed to force the initiation of the maintenance on the server.

2. The method of claim 1, wherein determining the system resource metric of the server comprises determining a number of requests in a request queue.

3. The method of claim 2, wherein the pre-determined threshold is based on a size of the request queue.

4. The method of claim 1, wherein determining the system resource metric of the server comprises determining a memory usage of the server.

5. The method of claim 4, wherein the pre-determined threshold is based on available memory of the server.

6. The method of claim 1, wherein the determining whether to initiate maintenance further comprises:
    calculating a probability metric based on the system resource metric; and
    determining whether to initiate maintenance based on the probability metric.

7. The method of claim 6, wherein the probability metric is based on a difference between the determined system resource metric and the pre-determined threshold for the system resource metric.

8. The method of claim 1, wherein determining whether to initiate maintenance is performed in response to a change in load of the server.

9. The method of claim 8, wherein a change in the load of the server comprises a new request from a client, and when a request from a client has been completed on the server.

10. The method of claim 1, wherein entering the not-in-service mode comprises notifying a client system that the server is unavailable for requests.

11. The method of claim 1, wherein entering the not-in-service mode comprises completing all requests on the server.

12. The method of claim 1, wherein entering the not-in-service mode comprises pausing all requests on the server.

13. The method of claim 12, wherein exiting the not-in-service mode further comprises resuming the paused requests on the server.

14. The method of claim 1, wherein exiting the not-in-service mode comprises notifying a client system that the server is available for requests.

15. The method of claim 1, wherein initiating maintenance on the server comprises executing garbage collection on the server.

16. The method of claim 15, wherein executing garbage collection on the server comprises:
    allocating a plurality of resources on the server;
    performing garbage collection on the server; and
    deallocating the plurality of resources on the server.

17. The method of claim 16, wherein the plurality of allocated resources comprises all the available unallocated memory on the server.

18. The method of claim 1, further comprising:
    receiving, using dispatcher control circuitry, a first notification that a first server of the plurality of servers has entered the not-in-service mode;
    indicating, using the dispatcher control circuitry, in a list of servers that the first server has entered the not-in-service mode;

selecting, using the dispatcher control circuitry, a second server in the list of servers to provide a job request to; and providing, using the dispatcher control circuitry, the job request to the selected second server.

19. The method of claim 18, further comprising:

receiving, using the dispatcher control circuitry, a second notification that the first server has exited the not-in-service mode; and indicating, using the dispatcher control circuitry, that the first server has exited the not-in-service mode.

20. The method of claim 18, wherein selecting a second server in the list of servers comprises:

determining, using the dispatcher control circuitry, whether the selected second servers is in the not-in-service mode and selecting the server; and selecting, using the dispatcher control circuitry, the second server if the server is not in the not-in-service mode.

21. The method of claim 18, wherein the list of servers only comprises servers which are not in the not-in-service mode.

22. The method of claim 18, further comprising receiving a job request from a client system to provide to the second server.

23. A system for managing system resources, the system comprising:

a plurality of servers, wherein each server of the plurality of servers comprises control circuitry executing instructions that cause the control circuitry to:

store job requests provided to the server within a request queue until being processed by the server;

allocate a portion of memory of the server to each job request actively being processed by the server, wherein the remaining portion of the memory includes unallocated memory available for job requests waiting within the request queue yet to be processed by the server;

determine a system resource metric of the server;

compare the system resource metric of the server with a pre-determined threshold value;

determine whether to initiate maintenance on the server based on the compare;

when determined to initiate maintenance:

determine a number of different servers of the plurality of servers that have entered a not-in-service mode; and compare the number to a threshold value of servers in the not-in-service mode, wherein the server is precluded from entering the not-in-service mode when the number exceeds the threshold value;

enter the server into the not-in-service mode when the server is not precluded from entering the not-in-service mode;

allocate the unallocated memory of the server when the server is not precluded from entering the non-in-service mode, the unallocated memory that is allocated comprising an amount of unallocated memory needed to force initiating maintenance on the server;

initiate maintenance on the server in response to the server entering the not-in-service mode; and upon completion of the maintenance, exit the not-in-service mode, and deallocate the memory needed to force the initiation of the maintenance on the server.

24. The system of claim 23, wherein the control circuitry of each server further executes instructions that cause the control circuitry to determine a number of the job requests stored in the request queue.

25. The system of claim 24, wherein the pre-determined threshold is based on a size of the request queue.

26. The system of claim 23, wherein the control circuitry of each server further executes instructions that cause the control circuitry to determine a memory usage of the server.

27. The system of claim 26, wherein the pre-determined threshold is based on available memory of the server.

28. The system of claim 23, wherein the control circuitry of each server further executes instructions that cause the control circuitry to:

calculate a probability metric based on the system resource metric; and determine whether to initiate maintenance based on the probability metric.

29. The system of claim 28, wherein the probability metric is based on a difference between the determined system resource metric and a pre-determined threshold for the system resource metric.

30. The system of claim 23, wherein the control circuitry of each server further executes instructions that cause the control circuitry to initiate maintenance in response to a change in load of the server.

31. The system of claim 30, wherein a change in the load of the server comprises a new request from a client, and when a request from a client has been completed on the server.

32. The system of claim 23, wherein the control circuitry of each server further executes instructions that cause the control circuitry to notify a client system that the server is unavailable for requests.

33. The system of claim 23, wherein the control circuitry of each server further executes instructions that cause the control circuitry to complete all requests on the server in response to entering the not-in-service mode.

34. The system of claim 23, wherein the control circuitry of each server further executes instructions that cause the control circuitry to pause all requests on the server in response to entering the not-in-service mode.

35. The system of claim 34, wherein the control circuitry of each server further executes instructions that cause the control circuitry to resume the paused requests on the server in response to exiting the not-in-service mode.

36. The system of claim 23, wherein the control circuitry of each server further executes instructions that cause the control circuitry to execute garbage collection on the server.

37. The system of claim 36, wherein the control circuitry of each server further executes instructions that cause the control circuitry to:

allocate a plurality of resources on the server; and deallocate the plurality of resources on the server.

38. The system of claim 23, further comprising a client system, wherein;

the client system comprises a plurality of clients; and each client of the plurality of clients comprises client control circuitry that executes client instructions that cause the client control circuitry to:

receive notification that a server has entered a not-in-service mode, indicate, in a list of servers, that the server has entered the not-in-service mode, select, in the list of servers, a first server to provide a job request, determine whether the first server is in the not-in-service mode, and provide the job request to the first server based on whether the first server is in the not-in-service mode.

39. The system of claim 23, further comprising a dispatcher system, wherein;
- the dispatcher system comprises a plurality of dispatchers; and
- each dispatcher of the plurality of dispatchers comprises dispatcher control circuitry that executes dispatcher instructions that cause the dispatcher control circuitry to:
  - receive notification that a server has entered a not-in-service mode,
  - indicate, in a list of servers, that the server has entered the not-in-service mode,
  - receive a job request from a first client;
  - select, in the list of servers, a first server to provide a job request,
  - determine whether the first server is in the not-in-service mode, and
  - forward the job request to the first server based on whether the first server is in the not-in-service mode.

40. The system of claim 39, further comprising a client system, wherein;
- the client system comprises a plurality of clients; and
- each client of the plurality of clients comprises client control circuitry that executes client instructions that cause the client control circuitry to provide a job request to the dispatcher system.

* * * * *